Patented Dec. 17, 1929

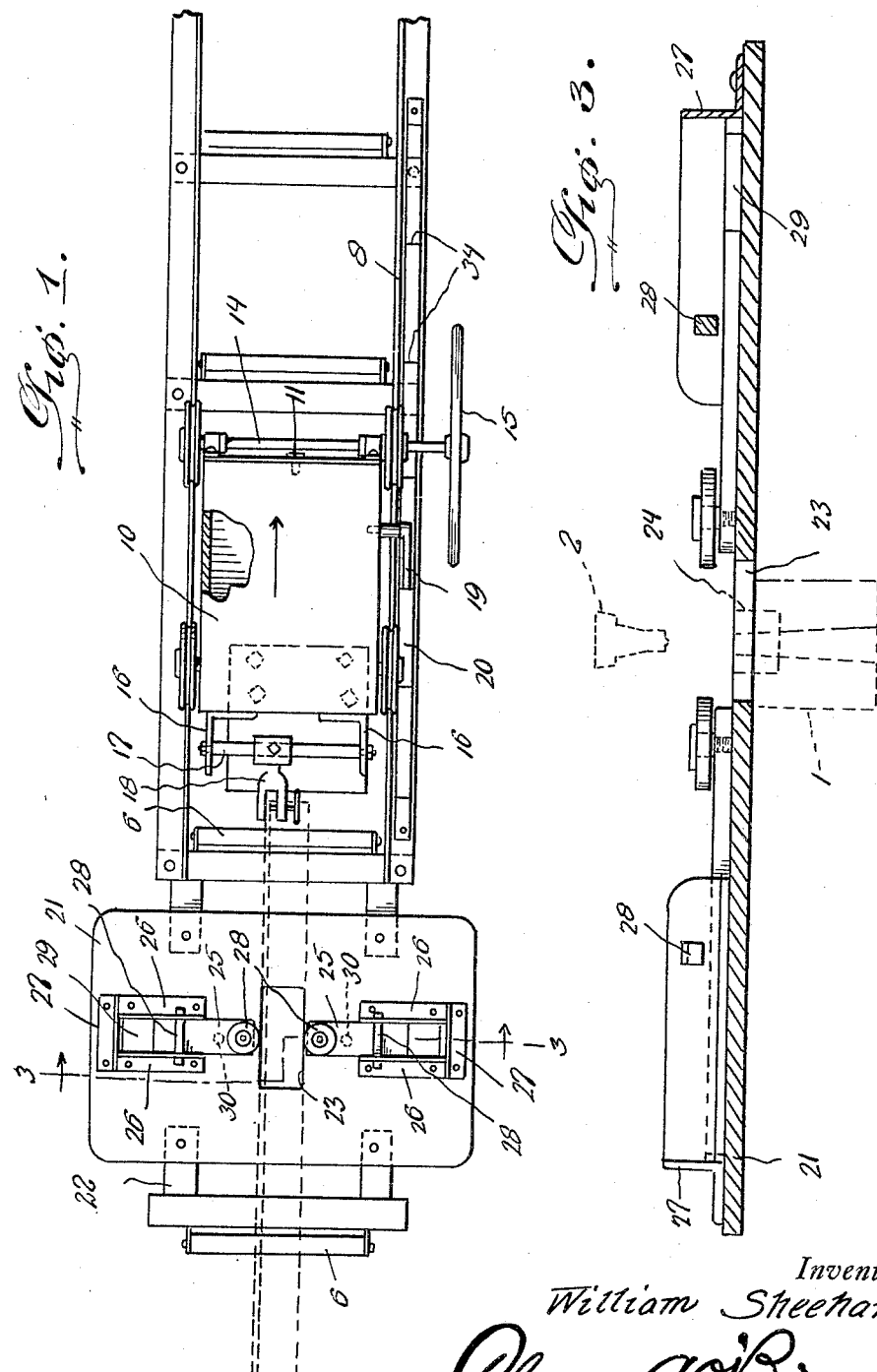

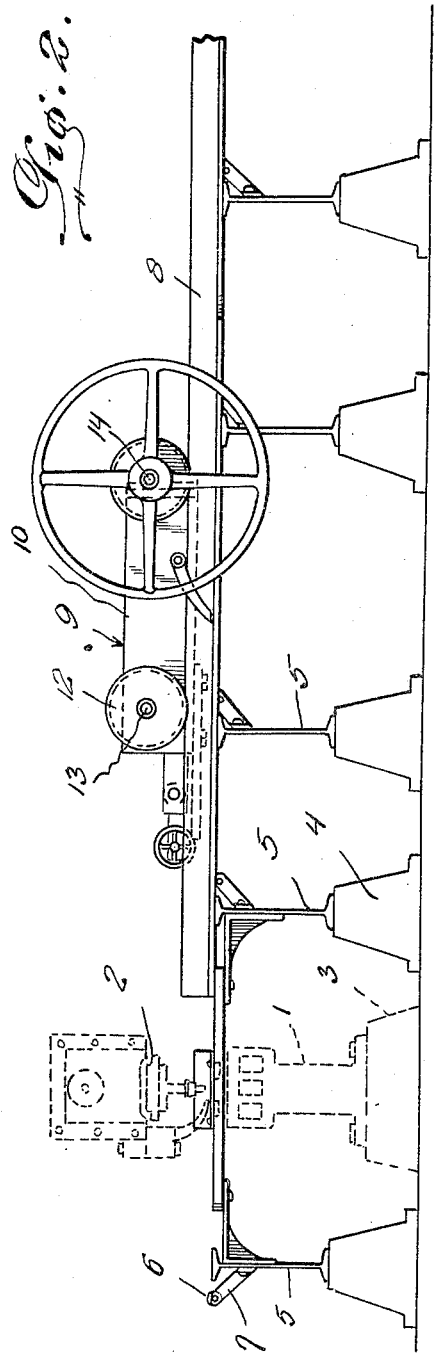
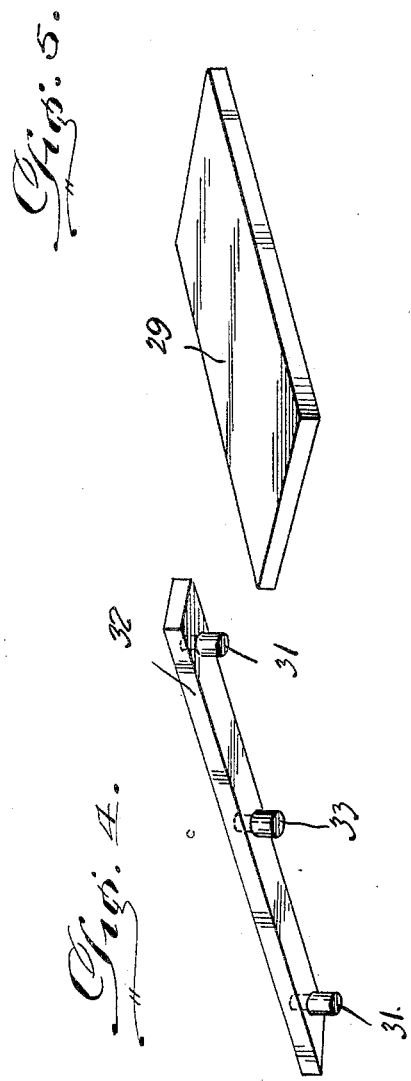

1,740,374

UNITED STATES PATENT OFFICE

WILLIAM SHEEHAN, OF ROCHESTER, INDIANA, ASSIGNOR OF ONE-HALF TO THE ROCHESTER BRIDGE COMPANY, OF ROCHESTER, INDIANA

PUNCH-GAUGING APPARATUS

Application filed November 5, 1926. Serial No. 146,475.

This invention relates to an apparatus designed to facilitate the punching of a series of openings in suitable material such as bars, angles, channels, and the like.

In building construction work, bridges, and other similar fabricated structures requiring the use of iron and steel, it is necessary to drill or punch numerous holes in bars, angles, channels, and beams or other similar material used in the building in a predetermined relation and which in accordance with the procedure followed in the prior art, requires a substantial amount of time and labor to accomplish the desired result.

In accordance with the prior art, it has been customary in drilling a plurality or series of holes in the flange of a beam and angle, in a bar or the like, to make a template provided with the holes formed therein in the proper position after the same have been laid off by measurements on the templates which is then used for the purpose of punching the centers for the holes in the material which is then suitably drilled or punched at the punched center, to obtain the proper size holes desired in the material.

This series of operations requires a substantial amount of time and a large amount of labor to lay off the necessary holes on the template and then also lay these holes off from the template on the material in addition to the use of a large amount of material in making the templates.

The present invention is designed to reduce the amount of work and labor necessary in punching or drilling holes in metal beams, bars, flanges, or similar material used in building structures, bridges and the like, and to this extent provides a machine structure or apparatus adapted to mount the material to be punched and suitably operate and control said material to gauge the position of the punches desired in a highly efficient manner, with the elimination of the laying out of the usual template.

An object of the invention resides in providing a suitable gauging table mounted on a suitable support adapted to movably mount the material to be punched with suitable means thereon for engaging and moving the material to be punched under the punching mechanism to form the openings therein, gauging means being provided for controlling the movement of the material under the punch and the operating means for moving said material so that the openings can be formed therein at the desired predetermined intervals.

The invention comprehends numerous other objects and advantages for simplifying the operation of punching suitable material such as angle beams and the like which are more particularly pointed out in the following detailed description and in the claim directed to the preferred form of construction it being understood, however, that various other constructions may be made for accomplishing the same results which are clearly within the scope of the invention as herein set forth.

In the drawings, forming part of this application:—

Figure 1 is a plan view of the improved apparatus.

Fig. 2 is a side elevation thereof.

Fig. 3 is a vertical sectional view taken on the line 3—3 of Fig. 1.

Fig. 4 is a perspective of the setting template for the spacing table.

Fig. 5 is a detail perspective of one of the gauge plates.

The punching machine with which this invention is used is of any of the several desirable types known and used in the art. 1 indicates the lower block of the punch machine carrying the female die, while the movable punch carrying structure is illustrated at 2 in dotted lines in Fig. 2, all of which is of the usual structure known to the art and suitably supported on a base 3. At opposite sides of the base 3 are mounted a plurality of spaced parallel supports 4 on the upper ends of which are mounted the I beams 5 in substantially parallel relation having the upper end lying in substantially the same horizontal plane. A plurality of rollers 6 mounted in brackets 7 secured to the portions of I beams 5 are mounted on said I beams as clearly illustrated in Figs. 1 and 2, having the peripheries thereof projecting above the plane of the upper ends of the I beams, for movably receiving and supporting angles, beams, or other suitable material to be punched.

These rollers 6 are mounted in alined relation on several beams as clearly illustrated in Fig. 1, and in alined relation with the punch blocks and punch of the punching mechanism.

At opposite ends of these supporting rollers 6 are suitably mounted a pair of spaced parallel track bars 8 which as illustrated are of angular formation, and support the movable carriage indicated generally at 9 for travel in alined relation to and from the punch mechanism.

This carriage comprises a hollow body 10 provided with a suitable plug 11 so that the interior of the body may be filled with heavy material such as dirt, sand or the like, and on the opposite sides which are positioned the supporting wheels 12 carried by suitable shafts 13 and 14 respectively, suitably journaled on the body 10. The shaft 14 extends outwardly beyond the track and I beam structure 5 as clearly shown in Fig. 1, and supports a substantially large hand wheel 15 so that an operator of the punch mechanism can suitably operate the carriage in a manner to be described.

The forward end of the body 10 is disposed toward the punch mechanism and is provided with a pair of angle brackets 16 connected by the bar member 17 on which is slidably mounted the clamp member 18 adapted to have the ends of a suitable beam or bar or other material to be punched, clamped therein so that movement of the carriage on the tracks 8 will move the material to be punched over the rollers 6 for the punching operation in a predetermined manner which will be described.

An indicator 19 is suitably and pivotally mounted on one side of the body 10 for cooperation with a template 20 removably secured in position on the bottom flange of one of the tracks 8 and which is laid off for cooperation with the indicator 19 for indicating the proper location longitudinally of the angle, beam, bar or material to be punched.

A spacing table 21 is mounted between the I beams at opposite sides of the punch mechanism as illustrated in Figs. 1 and 2 and suitably secured to these beams by brackets 22 so that the upper face of the tables lie within the same plane as the upper faces of the I beams 5. This spacing table is positioned over the lower punch block 1 and is provided with an opening 23 in the central portion of suitable size and shape through which projects the lower die on the punch block, in a manner as indicated in dotted lines at 24 in Fig. 3.

Gauge members are indicated at 25 which are slidably mounted on the upper face of the spacing table 21 laterally with respect to the movement of material to be punched over the table between suitable guide members 26 secured in spaced parallel relation on the table. End members 27 are secured at the outer ends of the guide members 26 to limit the outward sliding movement of the gauge members 25. The inner adjacent ends of the gauge members rotatably mount the gauge rollers 28 on the upper faces thereof for bearing engagement on opposite sides of the material to be punched as it is moved through the machine.

Suitable retaining pins 28 are removably mounted in the upper edges of the guide members 26 to retain the gauge members 25 in position on the spacing table 21, and which may be readily removed when it is desired to remove or place the gauge members.

Suitable gauge plates 29 as clearly shown in Fig. 5 are adapted for removable insertion between the guide members 26 for the gauge members 25 between the outer ends of said gauge members and the end plates 27 so that the gauge members 25 may be set for retaining a bar, beam, angle or the like in the proper position relative to the punch mechanism to obtain the proper lateral spacing of the holes punched in the material.

In order to obtain the proper initial mounting of the spacing table 21 with respect to the punch mechanism, said table is provided with openings 30 for receiving the pins 31 on the positioning templates 32 which is provided with a central pin 33 adapted to be received by the lower die members, 24. By the use of this template 32, the proper positioning of the table 21 is obtained in which the end pieces 27 are equally spaced at opposite sides of the die mechanism so that the gauge plates may be constructed of predetermined dimensions for setting the gauge members 25 to properly receive and guide bars, beams, angles, or the like, through the punch mechanism to obtain the punch openings at the proper distance from the edges.

Numerous of these gauge plates are provided so that the gauge members may be set for any desired dimensions.

To punch a bar or angle for example, with a plurality of openings, a strip of wood or other suitable material of a desired length to form a template 20 is provided in one face marked as indicated at 34, at the proper point for the longitudinal distance between the holes. This template has been positioned on the track bar 8 as illustrated in Fig. 1, and suitably set with respect to the indicator after the angle bar or other bar to be punched is secured in the clamp 18.

The gauge members 25 are set for the proper transverse position of the openings by placing suitable gauge plates 29 between the outer ends of the members 25 and the end pieces 27. The operator then moves the carriage 9 on the track bars 8 so that the indicator 19 is positioned opposite or on the line with the first mark 34 on the template, at which point the angle or other bar to be punched is properly positioned for the punching of the first hole.

Upon completion of the first punching operation, the operator then moves the carriage by the operation of the wheel 15 until the indicator 19 is positioned on the second mark 34 on the template which properly places the angle member or other material being punched for the second operation of the punching mechanism, which operation is continued until all holes through the length of the bar indicated on the template 20 have been punched.

The advantage of this manner of punching is in the fact that approximately twice as many holes may be punched in a given time than by the usual method prevailing in structural and other shops. In addition to this, the layer out may be eliminated, and considerable saving made in the amount of work to be performed by the template shop with a saving of the material necessary to make the template.

With the present invention the template shop merely makes a strip of narrow width which is suitably marked to indicate the positions of the carriage for the various positions of the work in the plunger. Thus the usual method of drilling holes in the template for punch marks and the marking of the template on the opposite side which requires the employment of a layer out and template maker is dispensed with, so that only the template maker is required to perform this work.

From the above description, it should be readily apparent that a simple and yet efficient apparatus has been provided for association with a punching mechanism to operate in conjunction therewith for accurately gauging and setting material to be punched so that a plurality of openings can be made therein at predetermined points in substantially accurate relation.

Having thus described my invention, what I claim as new is:

In a device of the class described comprising a spacing table mounted in a predetermined association with a punching mechanism and having an opening formed therein directly beneath the punch, a material handling carriage mounted for linear travel with respect to said spacing table and punching mechanism and adapted to move the work across the table over said opening, and a gauge structure comprising a pair of gauge plate holders fixedly mounted on the table at opposite sides of the opening, each including a pair of spaced parallel guide members having alined openings therein, and an end member arranged at the outer end thereof, a gauge member removably positioned on the table between said guide members and adapted for transverse adjustment on the table, retaining pins having their opposite ends supported in the openings of the parallel guide members for slidably retaining the gauge members on the table therebetween, and gauge plates of predetermined areas interchangeably positioned between the outer edge of each of the gauge members and the end members and adapted by reason of the area of the gauge plate to determine the position of the inner edge of its associated gauge member and guide rollers mounted at the inner edges of said gauge members.

In testimony whereof I affix my signature.

WILLIAM SHEEHAN.